United States Patent [19]

Haugen, Sr. et al.

[11] Patent Number: 5,568,215

[45] Date of Patent: Oct. 22, 1996

[54] FILM CARTRIDGE HOLDER AND ADAPTER UNIT

[75] Inventors: John M. Haugen, Sr., Everett; John M. Haugen, Jr., Lake Stevens; Kalvin L. Holler, Marysville; Charles T. Higgins, Kirkland, all of Wash.

[73] Assignee: Crown Photo Systems, Marysville, Wash.

[21] Appl. No.: 528,218

[22] Filed: Sep. 13, 1995

[51] Int. Cl.⁶ .......................... G03B 17/26; G03D 13/08
[52] U.S. Cl. ............................................. 396/512; 396/513
[58] Field of Search ............................... 354/275, 340

[56] References Cited

U.S. PATENT DOCUMENTS 5,333,033  7/1994  Blackman ........................ 355/27
5,369,457  11/1994  Koiwai et al. ...................... 354/275
5,406,346  4/1995  Hayakawa ........................ 354/275

Primary Examiner—Michael L. Gellner
Assistant Examiner—John Chizmar
Attorney, Agent, or Firm—Jacobson, Price, Holman & Stern, PLLC

[57] ABSTRACT

A film cartridge holder is provided including an elongated, generally cylindrical body defining a partial cylindrical cavity opening laterally outwardly at one side of the body. The side of the body opposite the one side thereof includes a laterally tangentially outwardly projecting hollow projection terminating outwardly in a slot-type outlet slit and defining a recess opening inwardly into the cavity. At least substantially all of the internal surfaces of the holder include a coating of velvet-like material for light sealed engagement with the opposing outer surfaces of a generally cylindrical film cartridge seated in the cavity.

11 Claims, 2 Drawing Sheets

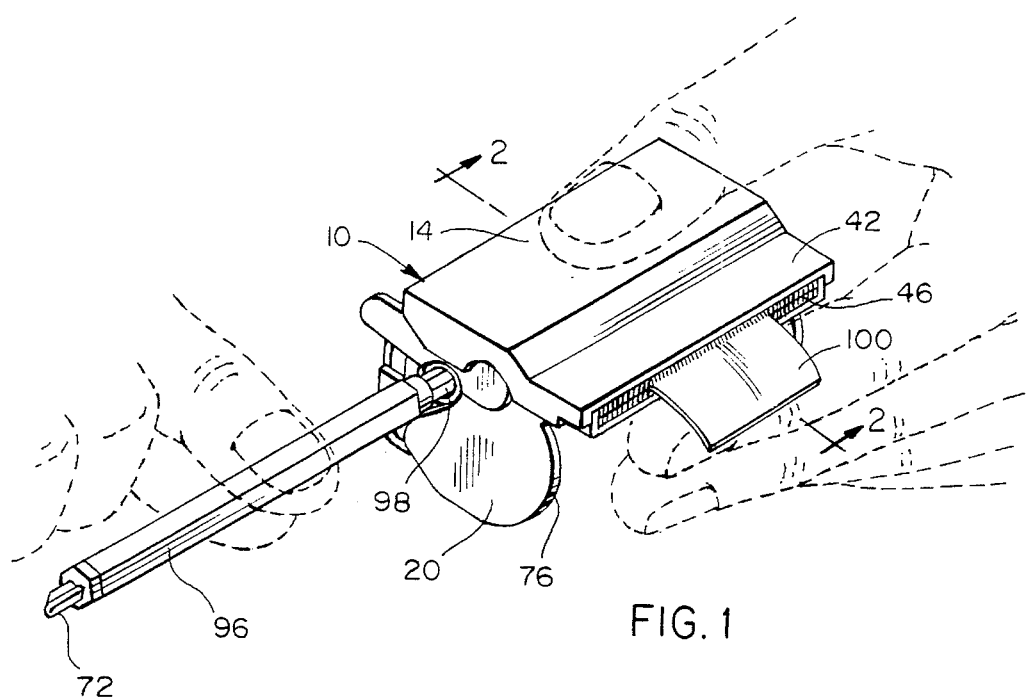
FIG. 1
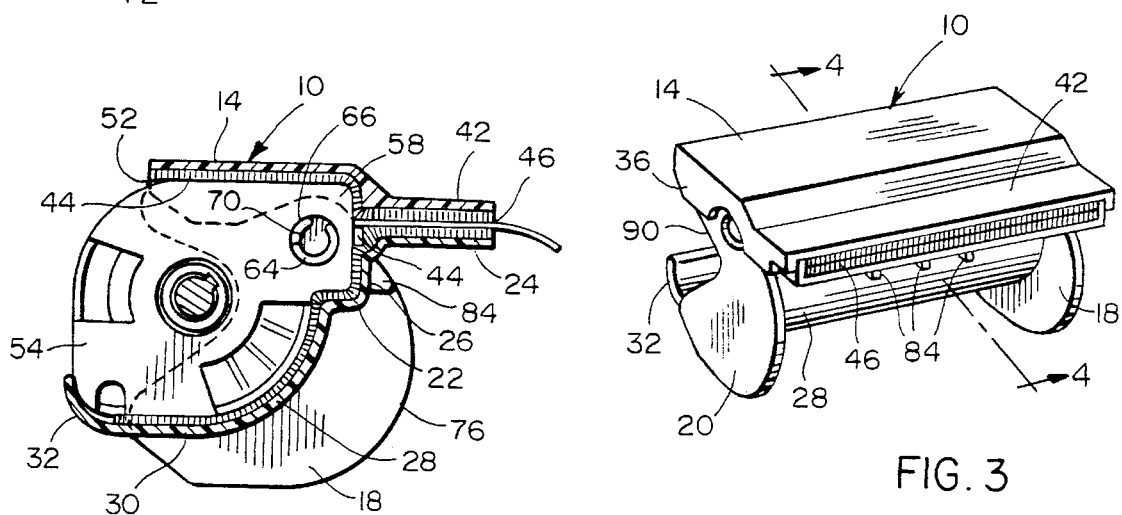
FIG. 2
FIG. 3
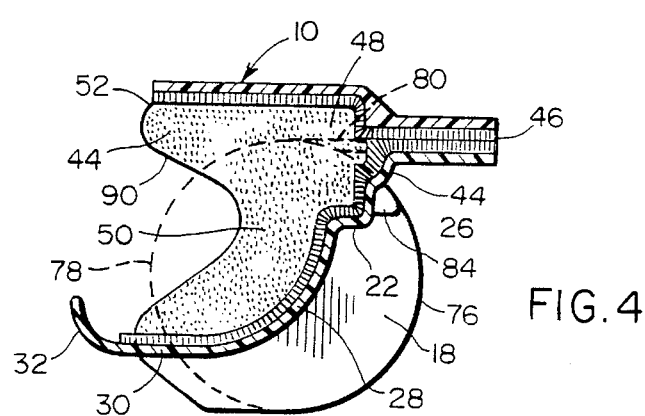
FIG. 4

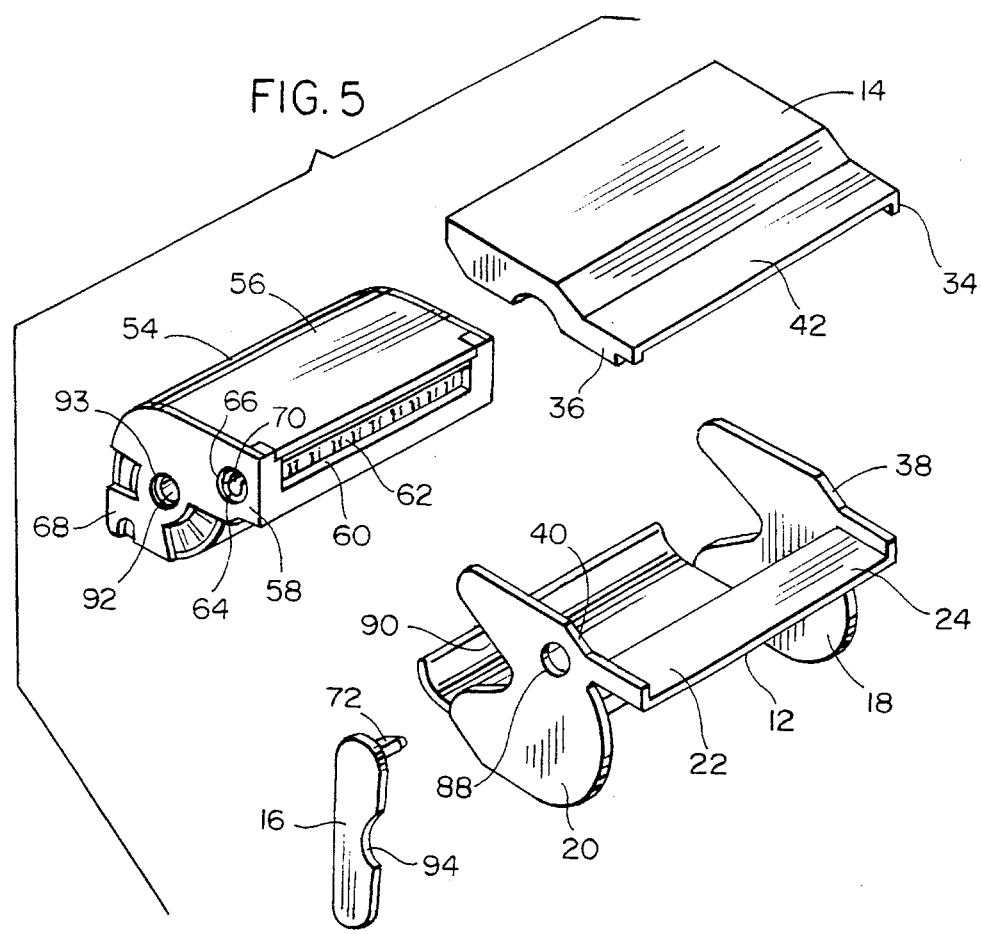
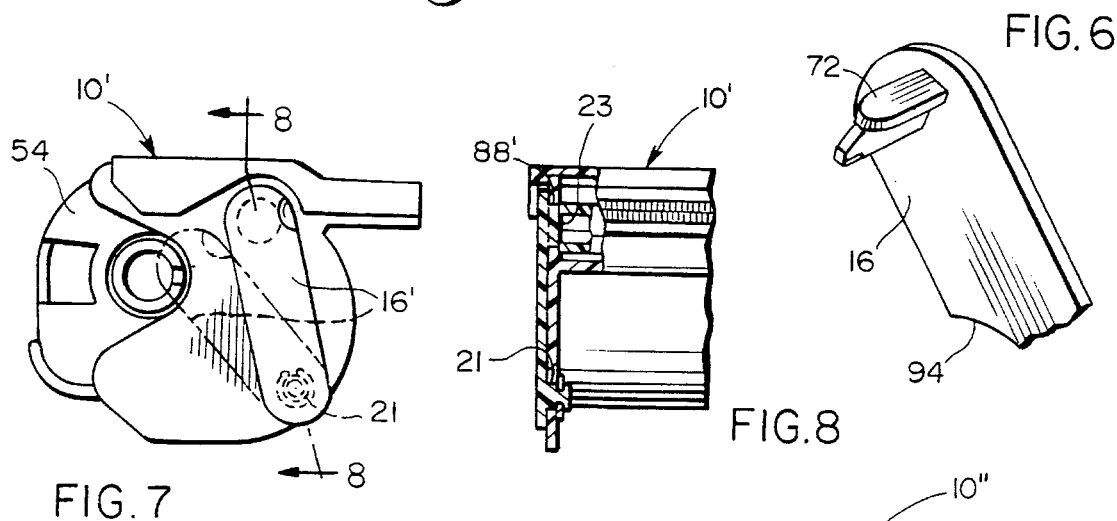
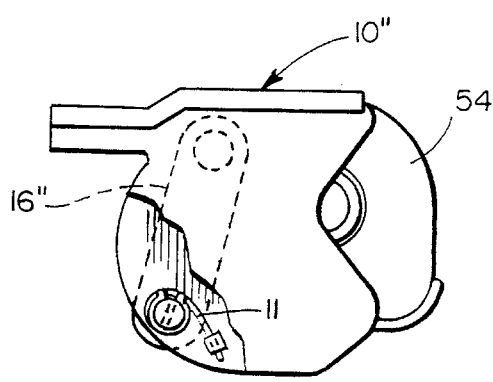

1

FILM CARTRIDGE HOLDER AND ADAPTER UNIT

FIELD OF THE INVENTION

This invention relates to a holder and adapter unit for a soon to be marketed film cartridge which is slightly smaller in diameter than a conventional 35 mm cartridge and which will adapt the newer smaller film cartridge for use in conjunction with existing 35 mm film developing machines, of various manufacture, which are presently in use in substantially all one hour film developing locations as well as other film developing locations. The holder and adapter unit of this invention thereby obviates the necessity of remanufacturing the "front end" of film developing machines to handle the new smaller film cartridges.

Further, if it is not feasible to remanufacture the "front end" of a film developing machine and the holder and adapter unit of this invention is not used, in order to develop the film contained in the newer smaller film cartridge, that film must be extended from the cartridge within a dark bag. After the film is substantially fully extended from the cartridge within the light bag the inner end of the film must be disengaged from the spool of the cartridge and the film strip must be completely withdrawn therefrom. Thereafter the film strip is inserted or wound into an empty intermediate film cartridge, or the like, such as a conventional 35 mm cartridge, all while the film and cartridges are contained within a dark bag, which process takes about 15 times the amount of time required to use the adapter unit of this invention.

This of course requires considerable additional labor costs and subjects the film strip to contamination which ultimately may lessen the quality of the prints obtainable therefrom after developing.

DESCRIPTION OF RELATED ART

Although there have been numerous adapters heretofore designed to adapt small components for use in apparatuses originally designed to handle larger components, we are unaware of any such adapters which have been specifically designed to enable a smaller film cartridge to be properly supported and handled by the front end of a film developing machine specifically designed to handle a larger conventional 35 mm film cartridge.

SUMMARY OF THE INVENTION

In the near future a new, smaller size film cartridge for newly developing still cameras thought to be eventual replacements for a majority of the present day 35 mm cameras will be marketed. Although film contained in these new film cartridges initially will be developed utilizing handling techniques which will be time consuming and thus increase developing costs, as the usage or popularity of such new film cartridges increases it will be necessary for the "front ends" of existing film developing machines to be reconfigured to enable the new film cartridges to be handled in much the same way that existing film developing machines now effectively handle conventional 35 mm film cartridges.

Although such reconfiguring of the "front end" of a film developing machine may not be excessively expensive, even if such reconfiguring is accomplished in a one hour film developing retail store, such reconfiguration would have to be of a quick conversion type so that a single film developing machine of a one hour film developing retail store could alternate between developing the newer film cartridges and existing 35 mm film cartridges.

However, even if such quick conversion type film developing "front ends" are designed, in order to economically develop both types of film it will be necessary to batch like film cartridges together for first developing the film of one type of cartridge and then developing film of the other type of cartridge. This of course would make it very difficult to maintain the popular one hour film developing service.

As an alternative to the development of a quick conversion type of "front end" for a film developing machine in order to enable that machine to develop not only the film from conventional 35 mm film cartridges, but also the film from the newer smaller film cartridges to be subsequentially marketed, the present invention resides in the development of a holder and adapter unit for holding the smaller film cartridge to be soon marketed and adapting that smaller film cartridge to be handled by the "front end" of existing film developing machines specifically designed to handle the larger 35 mm film cartridges.

The main object of this invention is to provide a combined film cartridge holder and adapter unit for a small size film cartridge which may be used as an adapter to enable the small size film cartridge to be handled by a film developing machine specifically designed to handle larger conventional 35 mm film cartridges.

Another object of this invention is to provide a film cartridge holder and adapter unit for containing a small size film cartridge equipped with a light door removably closing a tangential film strip inlet/outlet nose portion of the small film cartridge and with the holder designed in a manner to receive the small size film cartridge therein in a manner excluding ambient light from the inlet/outlet nose portion of the cartridge while enabling the door to be opened subsequent to the small film cartridge being received in the holder and providing access to one axial end of the film winding spool within the small cartridge such that rotary torque may be applied to the winding spool in order to eject the leader end of the film strip therein outwardly through the inlet/outlet nose of the small cartridge while the latter is seated within the holder.

Still another object of this invention is to provide a film cartridge holder of the non-disposable type and which therefore may be successively used to hold and adapt a large number of smaller film cartridges to have the film strips therein developed by a film developing machine specifically designed to handle conventional 35 mm film cartridges.

A final object of this invention to be specifically enumerated herein is to provide a film cartridge holder and adapter in accordance with the preceding objects and which will conform to conventional forms of manufacture, be of simple construction and easy to use so as to provide a device that will be economically feasible, long lasting and relatively trouble free in operation.

These together with other objects and advantages which will become subsequentially apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the film cartridge holder of this invention having a small film cartridge supported therefrom and with one axial end of the winding spool of the small cartridge exposed and having a torque input tool operatively engaged therewith for extending the leader end of the film strip of the small cartridge outwardly through the nose portion of the holder.

FIG. 2 is a transverse vertical sectional view taken substantially upon the plane indicated by the section line 2—2 of FIG. 1.

FIG. 3 is a perspective view of the holder without the small film cartridge supported therefrom.

FIG. 4 is a sectional view taken substantially upon the plane indicated by the section line 4—4 of FIG. 3 and with the outline of a conventional 35 mm film cartridge illustrated in phantom lines to indicate the manner in which the holder itself simulates the existence of a conventional 35 mm film cartridge when the holder is positioned on the "front end" of a film developing machine specifically designed to handle conventional 35 mm film cartridges.

FIG. 5 is an exploded perspective view of the cartridge holder and a small film cartridge to be held thereby.

FIG. 6 is an enlarged fragmentary perspective view of the upper end of the small film cartridge nose door operating lever illustrated in the lower portion of FIG. 5.

FIG. 7 is an end elevational view of the cartridge holder with a small film cartridge supported therefrom and the access opening of the holder providing access to the light door of the small film cartridge, which light door is closed through the utilization of a pivoted closure member whose open position is illustrated in phantom lines.

FIG. 8 is a fragmentary sectional view taken substantially upon the plane indicated by the section line 8—8 of FIG. 7.

FIG. 9 is an end elevational view of the assemblage illustrated in FIG. 7 as seen from the rear of FIG. 7 and with a portion of the near side end plate of the holder being broken away in order to illustrate the pivotal mounting and spring biasing of the closure member for the light door access opening of the holder.

DESCRIPTION OF THE PREFERRED EMBODIMENTS

Referring now more specifically to the drawings, the numeral 10 generally designates, in FIGS. 1-4, the film cartridge holder and adapter unit of this invention. The unit 10, as may best be seen from FIG. 5, includes three major components consisting of a main body 12, a cover 14 and a lever 16 which is independent of the body 12 and cover 14.

The body 12, see FIG. 5, includes a pair of substantially mirror image end plates 18 and 20 joined by a transverse plate 22 including an upper horizontal flange 24, an inclined and contoured intermediate portion 26 and a partial cylindrical lower portion 28 which terminates rearwardly and downwardly in a planar lower flange 30, the lower flange 30 terminating rearwardly in an upwardly curving rear flange 32. The flanges 24, 28, 30, 32 and the inclined contoured portion 26 are integrally formed.

The cover 14, see FIG. 5, includes opposite side depending flanges 34 and 36 and is secured over the stepped upper marginal edges 38 and 40 of the end plates 18 and 20 closing the upper end of the body, the forward lower horizontal portion 42 of the cover 14 closely opposing the horizontal flange 24 and the flange 36 being spaced slightly outwardly of the end plate 20.

The inner surfaces of the unit 10 are covered with a black velvet-like layer or coating 44 and the lower horizontal flange portion 42, the horizontal flange 24 and the inclined contoured portion 26 together define an outwardly projecting hollow extension 44 including a slot-type slit 46 for endwise receiving therethrough a film strip. Also, the extension 44 defines a hollow recess 48 into the interior cavity 50 defined by the body 12 and it will be noted that the side of the body 12 remote from the inclined portion 26 and the lower portion 28 is open as at 52.

The new small size film cartridge in connection with which the unit 10 is designed to be used is illustrated to advantage in FIG. 5 and is designated in general by the reference numeral 54. The cartridge 54 is somewhat similar to a conventional 35 mm film cartridge in that it includes a generally cylindrical body 56 equipped with an elongated generally tangentially outwardly projecting film strip inlet/outlet nose 58. The outlet nose 58 is hollow and opens inwardly into the interior of the body 56. The nose 58 includes an outlet opening 60 through which the leader end of a film strip may be projected and retracted and the opening 60 is removably closed by a light door 62 having opposite end shank portions 64 oscillatably supported in journal openings 66 formed in the end walls 68 of the cartridge 54. The shank portions 64 have notches 70 formed therein whereby a suitable operating shank 72, such as that illustrated in FIGS. 1, 5 and 6, may be engaged with the shank portion in order to angularly displace the latter for opening and closing the light door 62.

It is important to note from FIG. 4 of the drawings that the end plates or walls 18 and 20 include lower right hand marginal portions 76 which define slightly less than one half a circle, which circle is completed by the phantom lines 78 in FIG. 4.

The partials circular outline of the end plates 18 and 20 and the phantom line 78 together define the outline of a conventional 35 mm film cartridge and the phantom line representation 80 in FIG. 4 represents the generally tangential film strip inlet/outlet nose portion of a conventional 35 mm film cartridge.

In order to further duplicate part of the surface portions of a conventional 35 mm film cartridge, the body 12 additionally includes three abutment surface defining lugs 84 which are carried by the inclined contoured portion 26 and are generally equally spaced apart and between the end plates 18 and 20, see FIG. 3. It will be noted from FIG. 4 that the lugs 84 include surface portions which substantially coincide with the partial circular forward and lower surfaces of the end plates 18 and 20.

As can best be seen from FIG. 2 of the drawings, the cartridge 54 is snugly received through the open side 52 of the body 12 into tightly seated position within the cavity 50, the coating 44 forming a light tight seal with the opposing outer surfaces of the cartridge 54, the nose 58 being tightly received in the recess 48 and the outlet opening 60 being registered with the slit 46.

Also, it will be noted from FIG. 5 of the drawings that the journal opening 66 is registered with an access opening 88 formed in the end plate 20 such that access to the shank portion 64 may be gained. Further, the end plate 20 includes a rearwardly opening notch 90 therein with which the corresponding end of the film strip spool 92 of the cartridge 54 is registered through the opening 93 formed in the end wall 68 of the cartridge 54.

Once the cartridge 54 is positioned within the body 12, the operating shank 72 is inserted through the opening 88 and keyed to the shaft or shank portion 64 via the notch 70 with the lever 16 disposed in a substantially vertical position such as that illustrated in FIG. 5. Then, the lower end of the lever is swung toward the left and upwardly to the position thereof illustrated in FIG. 1 in order to open the light door 62, the free end of the lever 16 being held captive on the inside of the rear portion of the flange 36. At this point, the notch 94 of the lever 16 registers with the upper portion of the notch 90 to provide access to the film spool 92 and the hand tool 96, FIG. 1, may have the operating shank 98 on one end thereof inserted into the exposed end of the film strip spool 92 for keyed engagement therewith and the tool 96 may be rotated in a clockwise direction as viewed in FIG. 1 in order to extend the leader end 100 of the film strip outwardly of the cartridge 54 and holder unit 10.

At this point, the rear end of a conventional pull strip is attached to the leader end 100 and the closure door of the film developing machine (not shown) is opened. The unit 10 then is dropped into position with the circular periphery of the end plates 18 and 20 and the lugs 84 simulating the contour of a conventional 35 mm film cartridge. Thereafter, the door of the film developing machine is closed and the machine is actuated, whereby the aforementioned pull strip is pulled through the machine as well as the film strip as the latter is being pulled from the cartridge 54.

When it is desired to pass another film strip through the film developing machine, the door thereof is opened, the holder unit 10 containing the cartridge 54 is automatically ejected and the front end of the film developing machine is again ready to receive either a conventional 35 mm film cartridge or another holder or unit 10 containing a second cartridge 54. In this manner, a conventional film developing machine specifically designed to handle only 35 mm film cartridges may be alternatively used to handle both types of film cartridges without delay.

When the operating shank 72 of the lever 16 is passed through the access opening 88 and operatively engaged with the spool portion 64 and swung to the position thereof illustrated in FIG. 1, it is quite clear that the operating shank 72 locks the cartridge 54 within the holder or unit 10.

FIGS. 7 and 8 illustrate a modified form of unit 10' which is identical to the unit 10, except that the unit 10' includes an elongated lever 16' oscillatably supported from the end panel 20' as at 21 and including a short nipple 23 on its free end seatable within the opening 88' corresponding to the opening 88.

When the lever 16' is in the position thereof illustrated in solid lines in FIGS. 7 and 8, the opening 88' is closed against the entrance of ambient light therethrough. However, when the holder or unit 10' is used and it is desired to insert the operating shank 72 on the tool 96 into the shaft or shank portion 64 of the light door 60, the lever 16 is swung from the solid line position thereof illustrated in FIG. 7 to the dotted line position thereof, the operating shank 72 is quickly engaged with the shaft portion 64 through the journal opening 66 and rotated to open the light door 62. Then, the tool 96 is quickly removed and the lever 16' is swung back to the solid line position thereof illustrated in FIG. 8. During the time the access opening 88 is uncovered by the lever 16', insufficient ambient light enters into the holder and into the cartridge 54 in order to cause any adverse exposure of the film strip within the cartridge 54.

With attention now invited more specifically to FIG. 9 of the drawings, there may be seen a film cartridge holder or unit referred to in general by the reference numeral 10" which is identical to the unit 10' but which has added thereto a butterfly spring 11 for the purpose of yieldingly biasing the lever 16" corresponding to the lever 16 back to the closed position thereof corresponding to the closed position of the lever 16' illustrated in phantom lines in FIG. 7. Thus, when using the holder or unit 10", it is merely necessary to quickly swing the lever 16" to the open position, insert the operating shank 72 of the tool 96 through the access opening and into engagement with the shaft portion 64, rotate the tool 96 and then withdraw the operating shank 72 and release the lever 16" for swinging back to the closed position thereof shown in phantom lines in FIG. 9.

It is pointed out that when the holder or unit 10' is used, the lever 16 is not used. However, the operating shaft 98 on the tool 96 is used to extend the leader end 100 of the film strip in the cartridge 54 in each instance of use of the unit 10, the unit 10' and the unit 10".

The foregoing is considered as illustrative only of the principles of the invention. Further, since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination with a first film cartridge of the type including an elongated, generally cylindrical configuration including a generally tangential film strip inlet/outlet nose and wherein the general diameter of said cartridge is smaller than the diameter of the outer circular perimeter of a standard, similarly shaped still camera 35 mm film cartridge including a generally tangential film strip inlet/outlet nose portion, a film cartridge holder including an elongated, hollow body open on one longitudinal side and defining an open sided, partially cylindrical cavity snugly receiving said first film cartridge therein through the open side thereof and wherein the side of said holder opposite said open side includes a generally tangentially outwardly projecting, longitudinal hollow extension terminating outwardly in a slot-type outlet slit and defining a recess opening inwardly into said cavity, said nose being snugly received in said recess and including an outlet opening registered with said slit.

2. The combination of claim 1 wherein said holder, on the side thereof opposite said open side, includes outwardly facing exterior abutment surface portions substantially coinciding with the location of corresponding outer surface portions of said outer circular perimeter, such that a trough-shaped holder of a film developing machine for said 35 mm cartridge will properly support and hold said holder and first film cartridge therein.

3. The combination of claim 1 wherein said hollow body includes a velvet-like interior coating for light sealed engagement with the opposing surfaces of said first film cartridge.

4. The combination of claim 1 wherein said holder includes opposite ends each incorporating a transverse end plate, said end plates including outer, generally circular peripheral edges, on the side of said holder remote from said open side, generally coinciding with said outer circular perimeter.

5. The combination of claim 1 wherein said slot-type slit is substantially lined with a velvet-like interior coating for light sealed engagement with a film strip being withdrawn through said slit and outlet opening.

6. The combination of claim 1 wherein said first film cartridge includes a light door shiftably supported at least substantially fully within said nose and shiftable between first and second positions opening and closing, respectively, said outlet opening.

7. The combination of claim 6 wherein said light door is carried by stub axle portions journaled from opposite ends of said first film cartridge, at least one of said first film cartridge opposite ends including an access opening therein registered with the corresponding stub axle portion and through which a tool shank may be inserted for torque transfer engagement with the stub axle portion journaled from said one first film cartridge end.

8. The combination of claim 7 including a blade-type lever arm having opposite ends, one end of said lever arm including a laterally extending shank insertable through said access opening into torque transfer relation with said corresponding stub axle portion for angular displacement of the latter in response to angular displacement of said lever arm about said laterally extending shank, said holder including a keeper flange on said one first cartridge opposite end radially spaced from said access opening and facing in one angular direction thereabout, said lever arm being swingable, when swung in the other angular direction, to a position engaged beneath said flange for opening said door.

9. A film cartridge holder including an elongated body defining a partial cylindrical cavity opening laterally outwardly of one side of said body, said body on the side thereof opposite said one side including a generally tangentially laterally outwardly projecting hollow projection terminating outwardly in a slot-type outlet slit and defining a recess therein opening inwardly into said cavity, at least substantially all of the internal surfaces of said holder including a coating of velvet-like material for light sealed engagement with the opposing outer surfaces of a generally cylindrical film cartridge seated in said cavity.

10. The holder of claim 9 wherein said holder includes opposite ends each incorporating a transverse end plate, said end plates including outer, generally semicircular peripheral edges on the side of said holder remote from said open side.

11. The holder of claim 9 wherein said slot-type slit is substantially lined with a velvet-like interior coating for light sealed engagement with a film strip being withdrawn through said slit.

* * * * *